United States Patent [19]
Gremel et al.

[11] Patent Number: 5,876,667
[45] Date of Patent: Mar. 2, 1999

[54] BLOOD HEAT EXCHANGE SYSTEM EMPLOYING MICRO-CONDUIT

[75] Inventors: Robert F. Gremel, Huntington Beach; Sean D. Plunkett, Mission Viejo; Henry W. Palermo, Burbank, all of Calif.; Gary D. Reeder, Morrison, Colo.; Peter Z. Kubisa, Littleton, Colo.; Peter J. Hier, Castle Rock, Colo.

[73] Assignee: Medtronic, Inc., Minneapolis, Minn.

[21] Appl. No.: 584,275

[22] Filed: Jan. 11, 1996

[51] Int. Cl.$^6$ ........................................................ A61M 1/36
[52] U.S. Cl. ............................. 422/44; 165/133; 165/172; 604/4
[58] Field of Search ..................................... 165/133, 172; 422/44–48; 128/296.3; 604/4

[56] References Cited

U.S. PATENT DOCUMENTS

| | | | |
|---|---|---|---|
| 5,039,486 | 8/1991 | Gordon | 422/46 |
| 5,120,501 | 6/1992 | Mathewson et al. | 422/46 |
| 5,270,004 | 12/1993 | Raible | 422/46 |
| 5,429,184 | 7/1995 | Bach et al. | 422/46 |
| 5,578,267 | 11/1996 | Cosentino et al. | 422/46 |

*Primary Examiner*—Thomas G. Wyse
*Attorney, Agent, or Firm*—Baker, Maxham, Jester & Meador

[57] ABSTRACT

Micro-conduit with enhanced wetting characteristics for use in providing a blood heat exchanger apparatus with improved heat exchange capability. The micro-conduit comprises a plurality of elongated fibers, which may be made of a hydrophobic material such as polypropylene or polyethylene. Each fiber is open at two opposing ends, and has an inner surface between the open ends. The inner surface is coated with a wetting agent, such as phosphatidyl choline or another ampiphilic material with a hydrophilic end and a hydrophobic end. The fibers may have a shape and size that without presence of the wetting agent, would otherwise substantially impair free passage of water. The micro-conduit may be provided as a heat exchanger micro-conduit wrapping material, wherein micro-conduit fibers are attached to a thin flexible interconnect, such as woven netting, to maintain the fibers at predetermined spacings in substantially parallel alignment with each other. The wrapping material is wrapped about an elongated spindle to provide a generally cylindrical heat exchange core. Opposing first and second seals are created by applying potting compound between fibers proximate the spindle's first end and proximate the spindle's second end. After ends of the fibers are trimmed and sealed, a shell is placed around the core.

41 Claims, 3 Drawing Sheets

5,876,667

BLOOD HEAT EXCHANGE SYSTEM EMPLOYING MICRO-CONDUIT

BACKGROUND OF THE INVENTION

1. Field of the Invention

The present invention generally relates to heat exchangers for use in regulating the temperature of a patient's blood during surgery. More particularly, the invention concerns micro-conduit with enhanced wetting characteristics for use in the heat exchanger portion of a blood oxygenator.

2. Description of the Related Art

"Heart-lung" machines are known in the medical field. One component of these machines is a blood oxygenator. Blood oxygenators are typically disposable and serve to oxygenate a patient's blood during medical procedures such as heart surgery. Most blood oxygenators employ a gas transfer membrane, which comprises thousands of tiny hollow fibers having microscopic pores. Blood flows around the outside surfaces of these fibers while a controlled oxygen-rich gas mixture flows through the fibers. Also, due to the relatively high concentration of carbon dioxide in the blood arriving from the patient, carbon dioxide in the blood diffuses through the fibers' microscopic pores and into the gas mixture. Due to the relatively low concentration of oxygen in the blood arriving, from the patient, oxygen from the gas mixture diffuses into the blood through the fibers' microscopic pores.

Most blood oxygenators also employ a heat exchanger to precisely regulate the temperature of a patient's blood. The heat exchanger usually includes one or more conduits housed in a vessel. The patient's blood is continuously pumped through the conduits, while a heat exchange medium such as water flows through the vessel around the conduits, or vice versa. The heat exchange medium is either heated or cooled to maintain the patient's blood at a desired temperature.

One example of a commercially successful blood oxygenator is sold under the designation MAXIMA® by Medtronic Corp. In the MAXIMA blood oxygenator, the heat exchange medium (water) blood flows inside relatively large diameter metal tubes while blood flows on the outside of the tubes within the vessel. The TERUMO brand oxygenator uses a different configuration, where blood flows inside relatively large, diameter metal tubes. In the BARD WILLIAM HARVEY HF-5700 blood oxygenators the blood flows outside plastic tubes that contain a flow of temperature-regulated water.

Known heat exchangers, such as those described above, have benefited the purposes of doctors and patients alike in many different applications. However, in their quest to continually update these products, design engineers are always seeking improvements. In this regard, some applications may benefit from heat exchangers with improved heat exchange characteristics. One sure way to increase the heat exchange rate is to increase the area of contact between the blood and heat exchange medium. Enlarging the heat exchanger, however, is undesirable because of the greater bulk, the increased weight, and the enlarged blood volume required to fill the vessel.

A different way to improve the heat exchange efficiency is to increase the number of heat exchanger tubes while decreasing their size. Furthermore, by running, blood inside these smaller tubes, the blood is more thoroughly and evenly exposed to the heat exchange medium. This approach can be problematic because priming small diameter tubes can be difficult or impossible. When "priming" the heat exchanger tubes, typically an aqueous solution is pumped through the tubes to displace the ambient air. Then, blood is pumped into the tubes following the aqueous solution. Priming small plastic tubes is problematic because the tubes tend to act as capillary tubes, which are associated with certain undesirable properties. In particular, the use of a large number of tubes has the effect of reducing the pressure drop across the tubes. Therefore, if a few tubes become plugged with bubbles of air or water, the aqueous priming solution easily finds a path through other unplugged tubes. Consequently, the trapped bubbles reluctantly remain in the plugged tubes. There can be dangerous consequences if an air bubble somehow releases and subsequently passes into the patient's bloodstream. Therefore, lack of reliable priming can be a significant problem in heat exchangers with a large number of small diameter heat exchanger tubes.

Another problem with the above approach is finding an appropriate material for manufacturing the heat exchanger tubes. Many materials are not suitable for this application due to the obviously low tolerance to contamination and toxicity. Although metals have been successfully used in past blood heat exchangers, metals present a number of difficulties. First, since tubes of small diameter must be manufactured more precisely, they are more expensive than larger tubes. Furthermore, this expense is compounded due to the increased number of heat exchanger tubes required in this design.

Unlike metals, plastics are typically inexpensive. However, many desirable plastics have relatively low critical surface tension, and thus do not "wet" easily with water or other aqueous priming solutions. This aggravates the priming problems resulting from the capillary effect in small diameter tubes, as discussed above. Furthermore, plastics have poor heat transfer characteristics and therefore their use necessitates an even greater surface area to efficiently achieve the desired heat exchange.

SUMMARY OF THE INVENTION

Broadly, the present invention concerns micro-conduit with enhanced wetting characteristics for use in providing a heat exchanger apparatus with improved heat exchange capability. The micro-conduit comprises a plurality of elongated fibers, which may be made of a hydrophobic material such as polypropylene or polyethylene. Each fiber is open at two opposing ends, and has an inner surface between the open ends. The inner surface is coated with a wetting agent, such as phosphatidyl choline (known as "lecithin" ) or another ampiphilic material with a hydrophilic end and a hydrophobic end. The fibers may have a shape and size such that without the presence of a wetting agent, air bubbles would be present and would impair the free passage of water.

In accordance with the invention, the micro-conduit may be provided in a heat exchanger micro-conduit wrapping material. The wrapping material comprises micro-conduit fibers attached to a thin flexible interconnect, such as woven netting, to maintain the fibers at predetermined spacings in substantially parallel alignment with each other. The wrapping material is wrapped about an elongated spindle having first and second ends, such that the ends of each fiber reside proximate the spindle's first and second ends. After the ends of the fibers are trimmed as needed, a shell is placed around the wrapping material and spindle. Opposing first and second seals are created by applying potting compound between fibers proximate the spindle's first end and proximate the spindle's second end.

The invention may be implemented to provide various hardware devices, including micro-conduit material, micro-conduit wrapping material, and a heat exchanger apparatus, for example. The invention further includes methods for preparing, micro-conduit and various other related apparatuses.

The invention affords a number of distinct advantages. Importantly, since the micro-conduit has enhanced wetting characteristics, smaller micro-conduit fibers can be created without causing priming problems. With smaller micro-conduit, many more micro-conduit fibers can be used in the same volume, thereby increasing the overall surface area of the blood heat exchanger. Thus, the invention advantageously provides a blood heat exchanger with improved heat exchange characteristics. The greater number of micro-conduit fibers also minimizes the effect of any fibers that are plugged, avoiding any significant alteration of the flow how dynamics of the heat exchanger.

Moreover, the wetting agent applied to the micro-conduit advantageously ensures that the micro-conduit fibers are easily primed; this aids the introduction of aqueous priming solution or blood into the micro-conduit, as well as the removal of bubbles therefrom. Advantageously, the wetting agent comprises a material that occurs naturally in blood, is soluble in water, and does not have any pharmacological effect on humans.

Another advantage of the invention include its low cost, since the micro-conduit can be made from inexpensive materials. The micro-conduit is also beneficial for use in the manufacturing process, since it is lightweight, flexible, easily cut, and largely transparent. The invention may also provide other benefits, as discussed below.

BRIEF DESCRIPTION OF THE DRAWINGS

The nature objects, and advantages of the invention will become more apparent to those skilled in the art after considering the following detailed description in connection with the accompanying drawings, in which like reference numerals designate like parts throughout, wherein.

DETAILED DESCRIPTION OF PREFERRED EMBODIMENTS

I. STRUCTURE

As stated above, the present invention concerns micro-conduit with enhanced wetting characteristics for use in providing a heat exchanger apparatus with improved heat exchange characteristics. As discussed more thoroughly below, the hardware aspect of the invention includes a number of aspects, such as heat exchanger micro-conduit, the micro-conduit wrapping material, and the heat exchanger itself.

A. Micro-Conduit

Figure 1A:
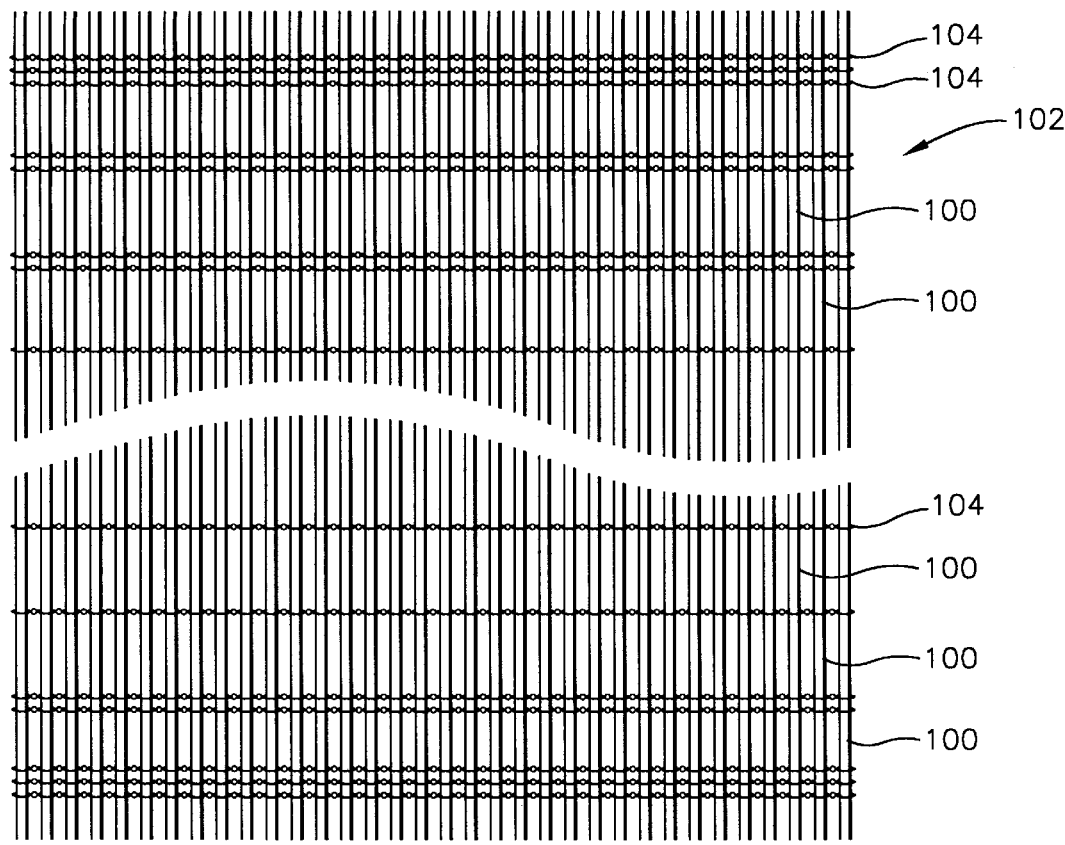
FIG. 1A is a plan view of micro-conduit wrapping material in accordance with the invention.
Figure 1B:
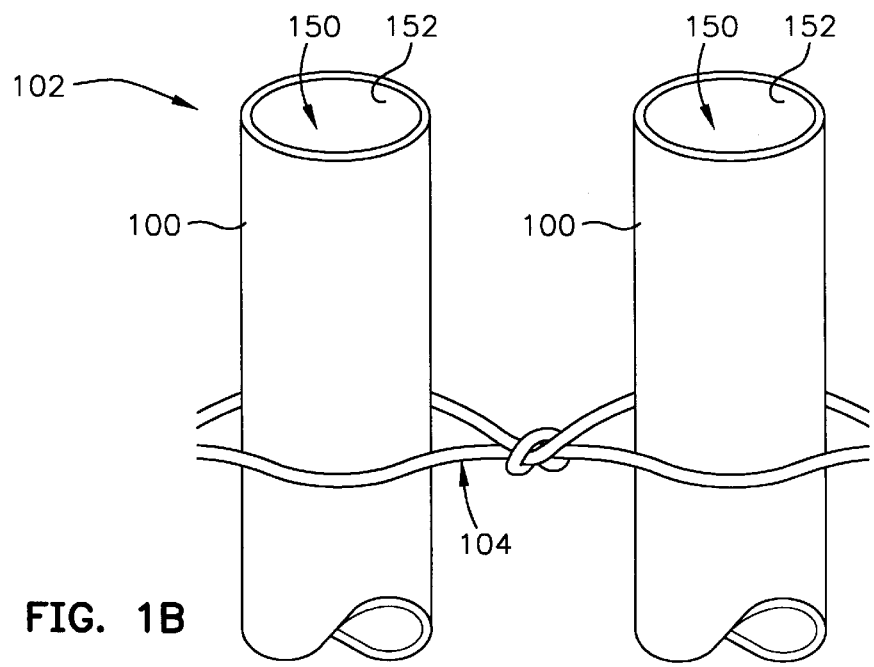
FIG. 1B is an enlarged perspective view of a section of micro-conduit wrapping material in accordance with the invention.

The heat exchanger micro-conduit of the invention, "micro-conduit" for short, preferably comprises a plurality of small fibers 100, as shown in FIG. 1A. In FIG. 1A, the fibers 100 are arranged in a "mat" or in micro-conduit wrapping material 102, which is described in greater detail below. Each fiber 100 comprises an elongated two-ended fiber. Each fiber 100 is hollow, with a cross-sectional shape preferably being rounded, or alternatively triangular, rectangular, or another appropriate shape. Since the fibers 100 are hollow, each fiber 100 has defined therein an inner channel 150 having an inner surface 152, as shown in FIG. 1B. In the illustrated embodiment, the fiber's outer diameter is about four hundred and seventy-five microns while the inner channel 150 has a diameter of about four hundred and twenty-eight microns. However, a wide variety of inner and outer diameters may be used, depending upon the requirements of the particular application. The difference between the inner and outer diameters is preferably small, to encourage heat exchange through the fibers' walls. The fibers 100 may be about ten centimeters long, for example. However, a wide range of fiber lengths may be used, depending upon the requirements of the particular application.

The fibers 100 may be made from a plastic material such as polypropylene, polyethylene, a different polymeric substance, or another material that is inexpensive, pharmacologically safe, lightweight, easily cut, and flexible. The material of the fibers 100 must also be easily formed into fibers with sufficiently small inner and outer dimensions. Preferably the fibers 100 would be made of a hydrophilic material, however, micro-conduit made of such material is not presently commercially available.

B. Wetting Agent

An important advantage of the invention is that the each fiber's inner surface 152 is coated with a wetting agent. As learned by the present inventors, polymer based micro-conduit is especially resistive to reliable priming. A material's critical surface tension is a measure of its "wettability." Generally, a liquid will wet to a surface with a critical surface tension greater than its own. In the case of polymeric micro-conduit, the wettability is poor because the polymer's critical surface tension is much smaller than that of water. However, by coating the fibers' inner surfaces with a wetting agent, the inventors have drastically improved the priming characteristics of the micro-conduit.

In one embodiment, the wetting agent may comprise an ampiphilic molecule, i.e. a two-ended molecule with dual character. One end is hydrophilic whereas the other end is hydrophobic. In this way, the hydrophobic end bonds to the polymeric fiber and the hydrophilic end provides sufficiently high surface tension for easy wettability during priming. In this regard, the wetting agent acts as a surfactant, since it increases the surface tension of the material contacted by the aqueous solution. The dual-character molecule of the wetting agent may comprise a phospholipid having both a palmatoyl component and a stearoyl component.

In a preferred embodiment, the wetting agent comprises hydrogenated phosphatidyl choline. This substance is available from the Naderman Corp, under the brand Phospholipin 90H (Trademark). This material presently has a U.S.P. Grade and Food and Drug Administration master file number, approving it for human intravenous use.

Figure 2:
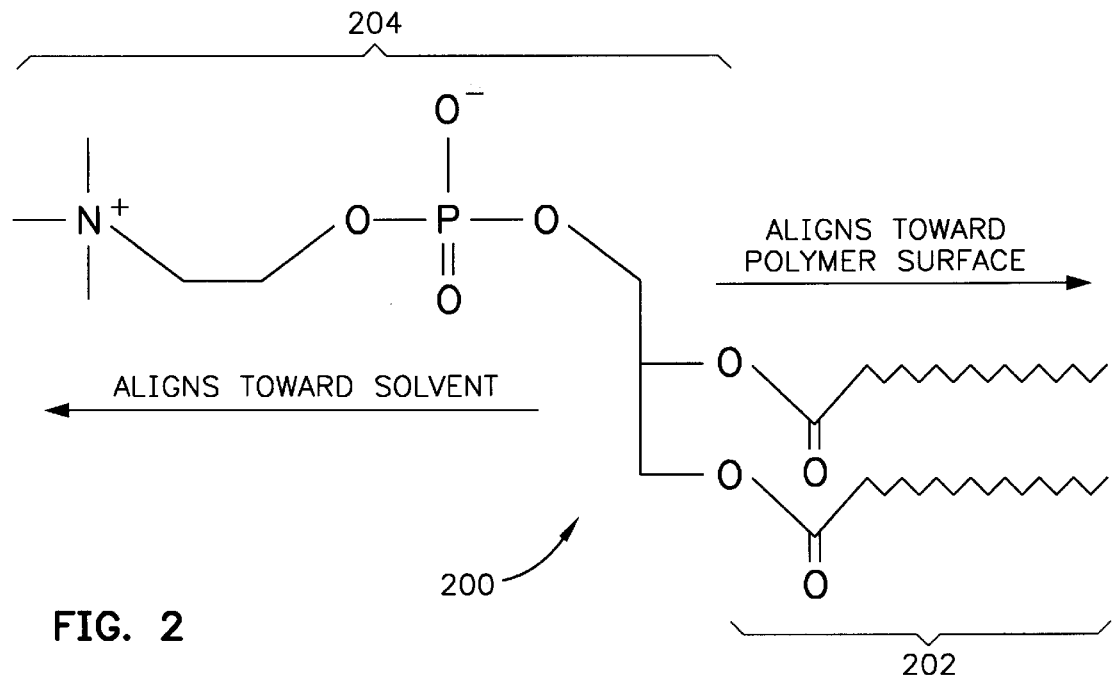
FIG. 2 is a molecular diagram of the chemical structure of a preferred wetting agent, phosphatidyl choline, in accordance with one embodiment of the invention.

FIG. 2 shows the chemical structure of phosphatidyl choline. The molecule 200 has a palmatoyl component 202, which is hydrophobic and tends to attach to the polymeric materials such as the fiber 100. The molecule 200 also has a stearoyl component 204, which is hydrophilic. When the palmatoyl component 202 bonds to the polymeric fiber 100, the stearoyl component 204 is exposed to the inner chamber of the fiber 100. The many stearoyl components 204 of the phosphatidyl choline molecules attached to the fiber 100 provide a hydrophilic coating on the fiber's inner surface 152. This hydrophilic coating, as discussed in greater detail below, provides the fiber 100 with good wettability, making it easy to prime.

According to the inventions a solution of highly purified lecithin is applied to the inside of the fibers 100 in a dilute, alcohol-based solution. The lecithin used is derived from food-grade lecithin which is a complex mixture of substances. The active ingredient is referred to herein as phosphatidyl choline. Phosphatidyl choline is actually a series of similar molecules. This series of molecules is a mixture of the diglycerides of stearic, palmitic and oleic acids, linked to the choline ester of phosphoric acid. Compositions of this general type are obtained primarily as a by-product of the manufacture of soybean oil. The technical name for the stearic form is distearoyl phosphatidyl choline (DSPC), while the name of the palmitic from is dipalmatoyl phosphatidyl choline (DPPC). Both of these compounds are phospholipids. They differ only in the number of carbon links in the hydrophobic carbon chain (FIG. 2). These compounds arc also referred to as amphiphiles (they are amphophilic) which indicates that one portion is air-loving (hydrophobic), and the other portion is water-loving, (hydrophilic). As such, they are members of the general class of molecules described as surfactants as well. The product Phospholipin 90H (Trademark) is at highly refined version of lecithin, with virtually all contaminants (primarily fatty acids and Mono- and di-glycerides) removed. The composition of Phospholipin 90H (Trademark) is given as 40% DSPC and 60% DPPC. Both of these substances occur naturally in the human blood stream, in fairly high amounts (1–2 g/liter).

The ability of lecithin to produce a more wettable surface is highly dependent on the method used to apply the coating to the surface. This is because DPPC and DSPC need to be applied as an oriented film. In other words, the hydrophobic tails must be lined up in parallel on one side (toward the polymer surface), with all the hydrophilic groups lined up on the other side, toward the solvent. In order to achieve this, the coating must be applied in a solvent that facilitates this organization. A solvent that is too hydrophobic (hexane, Freon, etc.) will attract the hydrophobic end and result with this portion facing up toward the air after application. If the solvent is too hydrophilic, though the solubility of the DSPC and DPPC will be too low, preventing efficient transfer to the surface. It is important to note that if the lecithin film is oriented in the wrong direction or if it is laid down in a random, unoriented fashion, no benefit will be derived from the coating.

When the molecules of the lecithin are properly applied, they act as a mask, hiding the hydrophobic surface of the fibers 100 and presenting a much more wettable, hydrophilic face. Thus when the aqueous priming solution is introduced, the critical surface tension of the coated capillaries is very close to that for the solution, allowing the solution to easily penetrate the capillaries and drive out all residual air. This results in clean, fast priming.

C. Micro-Conduit Wrapping Material

As mentioned above, FIG. 1 illustrates a section of micro-conduit wrapping, material 102. The material 102 includes a thin flexible interconnect 104 that maintains the fibers 100 at predetermined spacings in substantially parallel alignment with each other. In the illustrated embodiment, the interconnect comprises substantially parallel lengths of flexible thread that arc woven or knotted to hold the fibers about 0.5 mm apart, generally parallel to each other. The wrapping material 102 aids in positioning the fibers 100 during construction of a blood heat exchanger, as discussed below.

The mat or wrapping material 102 is preferably made of commercially available product from Mitsubishi Rayon Co., Ltd. sold under the designation HFE 430-1 Hollow Fiber, which uses polyethylene fibers. Similar wrapping material is also commercially available from Hoechst Celanese Corp. under the designation Heat Exchanger Fiber Mat, which uses polypropylene fibers.

D. Heat Exchanger Components

Figure 3:
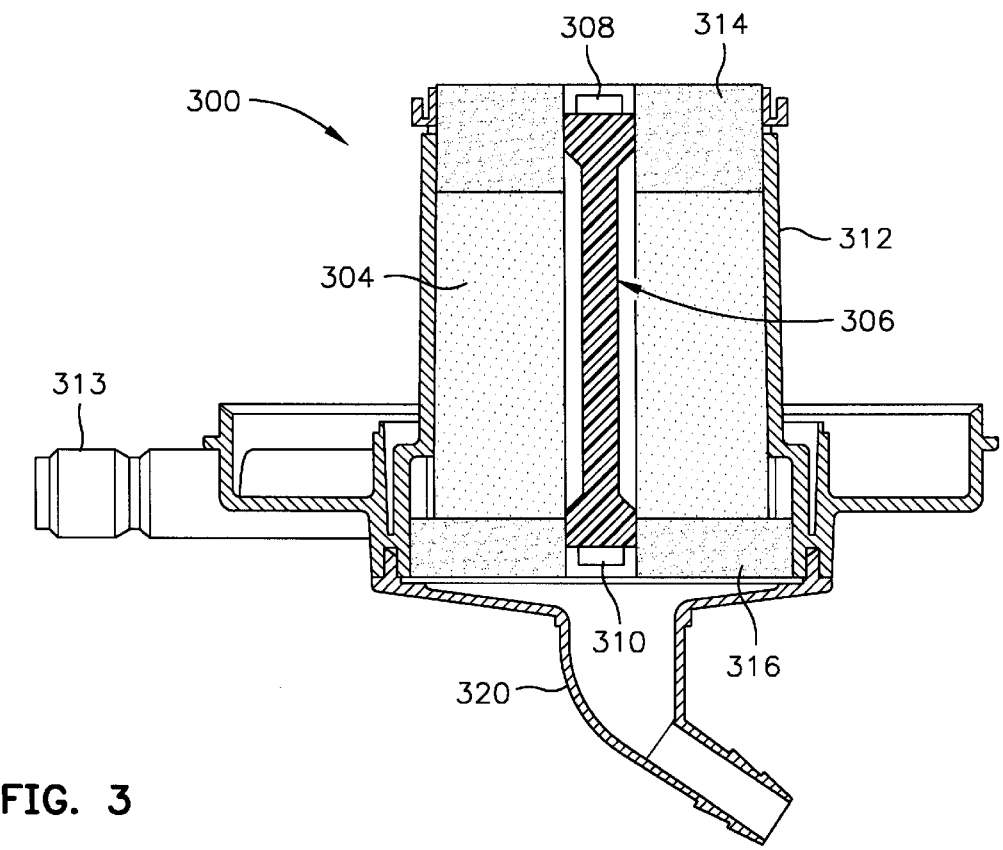
FIG. 3 is a vertical sectional view of a blood heat exchanger apparatus in accordance with the invention.

FIG. 3 depicts an example of a heat exchanger of the present invention. The heat exchanger 300 includes a generally cylindrical heat exchange core 304, which is made from wrapping material 102 compactly wound about a central spindle 306, preferably without any substantial tension. The spindle 306 has a first end 308 and a second end 310. The fibers 100 of the wrapping material are cut to provide substantially flat ends surfaces proximate the first and second ends 308, 310 of the spindle 306. The core 304 may therefore take the shape of a cylinder, for example. The core 302 may include about five thousand four-hundred fibers 100, for example.

A shell 312 encloses the core 304 and spindle 306. The shell 312 may include an inlet 313 and an outlet (not illustrated), to facilitate the flow of a heat exchange medium through the shell 312.

The core 304 includes an upper seal 314 and a lower seal 316. The upper seal 314, for example, comprises a layer of potting compound sealing applied between the fibers 100 proximate the spindle's first end 308. The lower seal 316 may be similarly structured. The potting compound may comprise polyurethane or another material of suitable utility and pharmacological safety.

The core 304 is enclosed within the shell 312 by an upper transition manifold (not illustrated) and a lower inlet manifold 320. Further details of the heat exchanger 300 are described in co-pending application Ser. No. 08/585,332 filed on Jan. 11, 1996, herewith entitled COMPACT MEMBRANE-TYPE BLOOD OXYGENATOR WITH CONCENTRIC HEAT EXCHANGER. The entire disclosure of the aforementioned patent application is specifically incorporated herein by reference. This application is assigned to Medtronic, Inc.

II CONSTRUCTION & OPERATION

In addition to the hardware aspect discussed above, the present invention also includes a method aspect, exemplified by the following description of methods for manufacturing micro-conduit and a blood heat exchanger.

A. Assembly of Heat Exchanger Micro-Conduit

Figure 4:
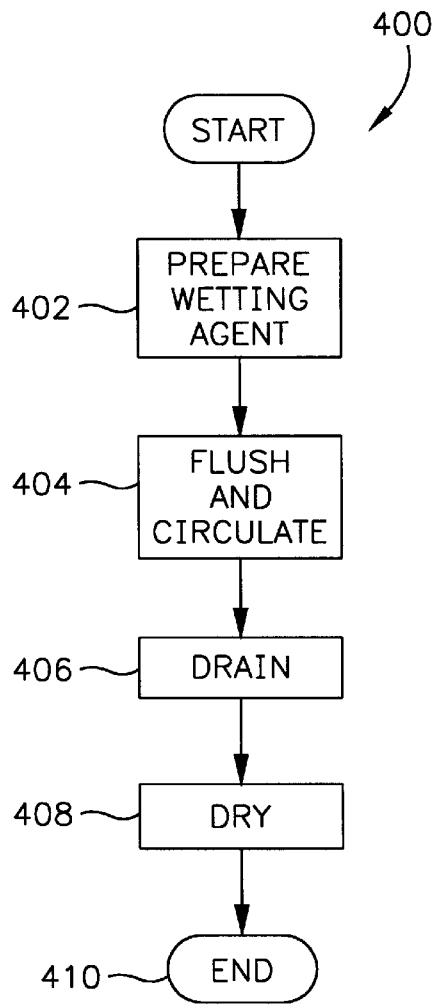
FIG. 4 is a flowchart of a sequence of steps used in preparing micro-conduit in accordance with the invention.

FIG. 4 depicts a flowchart illustrating a sequence 400 for manufacturing heat exchanger micro-conduit, as an example of the invention. First, in task 402 the wetting agent is prepared. In the preferred embodiment, this involves dissolving 0.1% phosphatidyl choline (by weight) in 99.9% isopropyl alcohol. Then, in task 404 the wetting agent is flushed through the fibers 100. The wetting agent may also be recirculated through the fibers 100 to ensure complete coating of the inner surfaces 152. Next, the wetting agent is drained from the fibers 100 in task 406. In task 408, the fibers' inner surfaces 152 are dried. This may be performed by air drying, room temperature blow drying, heated air, infrared heat drying, or another suitable procedure. With the wetting agent described above, the drying step 408 involves evaporation of the isopropyl alcohols leaving the phosphatidyl choline to evenly coat the inner surfaces of the fibers 100. The palmatoyl components of each phosphatidyl choline molecule attach to the polyolefin fibers. These molecules' hydroxyl groups, which do not attach to the fibers, provide the hydrophilic coating that gives the fibers' inner surfaces good wettability. The sequence 400 ends in task 410.

B. Assembly of Heat Exchanger

Figure 5:
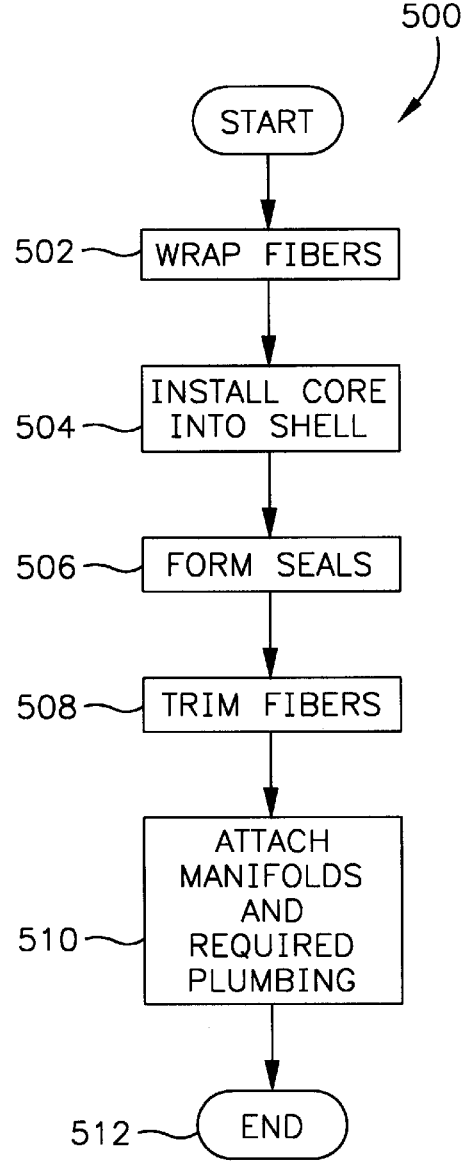
FIG. 5 is a flowchart of a sequence of steps used in preparing a heat exchanger apparatus in accordance with the invention.

FIG. 5 illustrates a sequence 500 for manufacturing a blood heat exchanger in accordance with one example of the invention. First, in task 502 the micro-conduit wrapping material 102 is wrapped about the spindle 306. In task 504 the fibers are installed into the shell. In task 506, the upper and lower seals 304, 316 are formed. In particular, potting compound is injected between the fibers 100 near the upper and lower surfaces of the core 304. Sufficient potting compound is applied to substantially seal the spaces between the fibers. Then, in task 508 the fibers 100 are trimmed proximate the first and second ends 308, 310 of the spindle 306. Preferably, the trimmed fibers 100 form uniform flat upper and lower surfaces of the core 304. With the seals 314, 316 in place, liquids such as aqueous priming, solution and blood may be directed into the fibers 100 through their ends, without leaking any liquid into the spaces between the fibers. These spaces, as discussed below, are reserved for a heat exchange medium such as water. Finally, in task 510 the manifolds, such as 320, are attached to the shell 312. Also in task 508, hoses and other plumbing lines are attached to the heat exchanger 300 as needed, for transportation of heat exchange medium, blood, priming solution, oxygen, and other media as appropriate.

C. Operation

Generally, the heat exchanger 300 serves to regulate the temperature of a patient's blood during a medical procedure such as open heart surgery. Referring to FIG. 3, a heat exchange medium such as water flows into the shell 312 through the inlet 313 during the medical procedure. While in the shell 312, the medium passes between the fibers 100, surrounding them. Due to the large number of fibers 100 and the fibers' small size, there is a substantial area of surface contact between the heat exchange medium and the contents of the fibers 100.

During ongoing operation of the heat exchanger 300, the fibers 100 contain the patient's blood, which flows into the inlet manifold 320, through the fibers 100 of the core 304, and exits through the transition manifold (not illustrated). As explained above, the temperature of blood flowing through the core 302 is efficiently regulated, due to the high degree of contact between the blood and the heat exchange medium.

However, before directing any blood through the fibers 100, it is important to prime the fibers 100. Priming is performed to remove air from the fibers. To prime the fibers 100, a preferably aqueous priming solution such as a saline solution is pumped through the fibers 100. Priming may be performed, for example, with a flow rate of five liters/minute. Priming is preferably conducted such that the wetting solution evenly contacts all fibers simultaneously, and thereafter uniformly discharges all air from the fibers.

During priming, the fibers 100 are easily wetted due to the presence of the wetting agent that coats the fibers' inner surfaces. If the wetting agent is phosphatidyl choline or another water soluble material, priming advantageously washes away the wetting agent, leaving the fibers' inner surfaces wet and ready for the flow of blood without the danger of air bubbles, plugged tubes, and the like. Any possible remnants of the wetting agent do not present any danger to the patient, since the wetting agent is pharmacologically safe and nontoxic, as discussed above with the example of phosphatidyl choline.

After priming, the flow of aqueous priming solution is discontinued, and replaced by the patient's blood. Although the wetting agent has been washed away, the fibers' inner surfaces are still receptive to blood because they have already been thoroughly wetted.

During the flow of blood through the fibers, heat exchange with the heat exchange medium enveloping the fibers is efficiently conducted, due to the fibers' small cross-sectional size and the thinness of the fibers' walls.

For further description of the heat exchanger's construction and operation, reference is made to the aforementioned U.S. patent application Ser. No. 08/585,322 filed Jan 11, 1996

III. TESTING

An exemplary embodiment of heat exchanger 300 was constructed in accordance with the invention for testing and evaluation. The test-model heat exchanger included a core 304 of five thousand four-hundred fibers 100, each having a length of about three inches. To roughly gauge the performance of the test-model heat exchanger, a blood flow of six liters/minute was maintained through the fibers 100 after priming pursuant to the invention. Simultaneously, a water flow of fifteen liters/minute was maintained through the core 304. The incoming blood's temperature was thirty degrees Celsius., and the incoming water's temperature was forty degrees Celsius. The blood's hemoglobin was twelve grams/deciliter.

The temperature of the outgoing blood and water was measured and averaged, based upon several different experiments conducted under the conditions listed above. Based upon this information, a "performance factor" of 0.65 was computed for the test-model heat exchanger 300, using the formula of Equation 1, below.

$$\text{performance factor} = \frac{B_{out} - B_{in}}{W_{in} - B_{in}} \quad [1]$$

where:

$B_{in}$=the temperature of the incoming blood, set at 30° Celsius;

$W_{in}$=the temperature of the incoming water, set at 40° Celsius; and $B_{out}$=the temperature of the outgoing blood.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A heat exchanger apparatus, comprising:
a plurality of elongated substantially parallel hollow fibers arranged to form a core, each fiber being made of a polymeric material, each said fiber being open at two opposing ends and having an inner surface between the open ends, each fiber having a shape and size that substantially impairs free passage of water therethrough without the presence of a wetting agent;
a shell enclosing the core;
a first seal comprising, a layer of potting compound sealingly applied between fibers proximate the spindle's first end; and
a second seal comprising a layer of potting compound sealingly applied between fibers proximate the spindle's second end.

2. The apparatus of claim 1, the polymeric material is polyethylene.

3. The apparatus of claim 1, the polymeric material is polypropylene.

4. The apparatus of claim 1, wherein each fiber has a round cross-section.

5. The apparatus of claim 1, further comprising a wetting agent coating, the inner surface of each fiber.

6. The apparatus of claim 5, wherein the wetting agent comprises lecithin.

7. The apparatus of claim 5, wherein the wetting agent comprises phosphatidyl choline.

8. The apparatus of claim 5, wherein the wetting agent is phosphatidyl choline.

9. The apparatus of claim 5, wherein the wetting agent comprises an ampiphilic material having a palmatoyl component and stearoyl component.

10. The apparatus of claim 5, wherein the wetting agent comprises an ampiphilic material having a hydrophobic component and a hydrophilic component.

11. The apparatus of claim 5, wherein the wetting agent comprises a surfactant.

12. The apparatus of claim 5, wherein the wetting agent comprises a hydrophilic material.

13. A heat exchanger apparatus, comprising:
a plurality of elongated hollow fibers each being made of a polymeric material, each said fiber being open at two opposing ends and having an inner surface between the open ends;
a wetting agent coating the inner surface of each fiber;
a shell enclosing the core, interconnects and spindle;
a first seal comprising a layer of potting compound sealingly applied between fibers proximate the spindle's first end; and
a second seal comprising a layer of potting compound sealingly applied between fibers proximate the spindles second end.

14. A heat exchanger micro-conduit, comprising an elongated hollow fiber being made of a polymeric material, said fiber including an inner surface and being open at two ends, said fiber having a shape and size that substantially impairs free passage of water therethrough without the presence of a wetting agent.

15. The micro-conduit of claim 14, wherein the polymeric material comprises polyethylene.

16. The micro-conduit of claim 14, wherein the polymeric material comprises polypropylene.

17. The micro-conduit of claim 14, wherein the fiber has a round cross-section.

18. The micro-conduit of claim 14, wherein the inner surfaces are coated by a wetting agent.

19. The micro-conduit of claim 18, wherein the wetting agent comprises lecithin.

20. The micro-conduit of claim 18, wherein the wetting agent comprises phosphatidyl choline.

21. The micro-conduit of claim 18, wherein the wetting agent is phosphatidyl choline.

22. The micro-conduit of claim 18, wherein the wetting agent comprises an ampiphilic material having a palmatoyl component and stearoyl component.

23. The micro-conduit of claim 18, wherein the wetting agent comprises an ampiphilic material having a hydrophobic component and a hydrophilic component.

24. The micro-conduit of claim 18, wherein the wetting agent comprises a surfactant.

25. The micro-conduit of claim 18, wherein the wetting agent comprises a hydrophilic material.

26. The micro-conduit of claim 14, the interconnect comprising a woven netting.

27. A heat exchanger micro-conduit, comprising;
an elongated hollow fiber being made of a polymeric material, said fiber being open at two opposing ends and having an inner surface between the open ends; and
a wetting agent coating the inner surface.

28. A heat exchanger micro-conduit wrapping material, comprising:
a plurality of elongated fibers, each fiber being made of a polymeric material, each fiber including an inner surface and being open at two opposing ends, each fiber having a shape and size that substantially impairs free passage of water therethrough without presence of a wetting agent; and
a thin flexible interconnect maintaining the fibers at predetermined spacings in substantially parallel alignment with each other.

29. The wrapping material of claim 27, wherein the polymeric material comprises polyethylene.

30. The wrapping material of claim 27, wherein the polymeric material comprises polypropylene.

31. The wrapping material of claim 27, wherein each fiber has a round cross-section.

32. The wrapping material of claim 27, wherein each fiber has an inner surface between the two ends coated by a wetting agent.

33. The wrapping material of claim 31, wherein the wetting agent comprises lecithin.

34. The wrapping material of claim 31, wherein the wetting agent comprises phosphatidyl choline.

35. The wrapping material of claim 31, wherein the wetting agent is phosphatidyl choline.

36. The wrapping material of claim 31, wherein the wetting agent comprises an ampiphilic material having a palmatoyl component and stearoyl component.

37. The wrapping material of claim 31, wherein the wetting agent comprises an ampiphilic material having a hydrophobic component and a hydrophilic component.

38. The wrapping material of claim 31, wherein the wetting agent comprises a surfactant.

39. The wrapping material of claim 31, wherein the wetting agent comprises a hydrophilic material.

40. A heat exchanger micro-conduit wrapping material, comprising:

a plurality of elongated fibers, each comprising a polymeric material and being open at two opposing ends, each fiber having an inner surface between the two ends coated by a wetting agent; and a thin flexible interconnect maintaining the fibers at predetermined spacings in substantially parallel alignment with each other.

41. A method of manufacturing a conduit for use in a blood heat exchanger, comprising the steps of:

providing an elongated fiber comprising a polymeric material, said fiber being open at two opposing ends and having an inner surface between the open ends; and coating the inner surface with a wetting agent by performing steps comprising:

flushing the fiber's inner surface with the wetting agent; and drying the inner surface.

* * * * *